United States Patent [19]
Williams et al.

[11] 3,909,578
[45] Sept. 30, 1975

[54] JOINING METAL SHEET OR STRIP

[75] Inventors: Arthur L. Williams, Warren; Robert S. Ellis, Canfield, both of Ohio

[73] Assignee: Wein United, Inc., Pittsburgh, Pa.

[22] Filed: Sept. 26, 1973

[21] Appl. No.: 400,857

Related U.S. Application Data

[62] Division of Ser. No. 57,159, July 22, 1970, abandoned.

[52] U.S. Cl. ............................................. 219/82
[51] Int. Cl.² ....................................... B23K 11/06
[58] Field of Search ............................ 219/82, 83

[56] References Cited
UNITED STATES PATENTS

| | | | |
|---|---|---|---|
| 1,230,114 | 6/1917 | Cary | 219/83 |
| 3,313,911 | 4/1911 | Seeloff | 219/82 |
| 3,510,625 | 5/1970 | Wheeler et al. | 219/83 X |

Primary Examiner—J. V. Truhe
Assistant Examiner—N. D. Herkamp
Attorney, Agent, or Firm—Michael Williams

[57] ABSTRACT

Apparatus for and method of joining the trailing and leading ends of a pair of metal sheet or strip sections, preferably in a continuous strip processing line, comprising a shear for trimming the ends of the sections, clamps for clamping the trimmed ends and holding them in narrow overlapped relation, planishing means to mash down the overlapped ends and welding means to weld the mashed-down ends, the clamps holding the overlapped ends against movement in a longitudinal direction away from each other after trimming and during planishing and welding operations.

6 Claims, 5 Drawing Figures

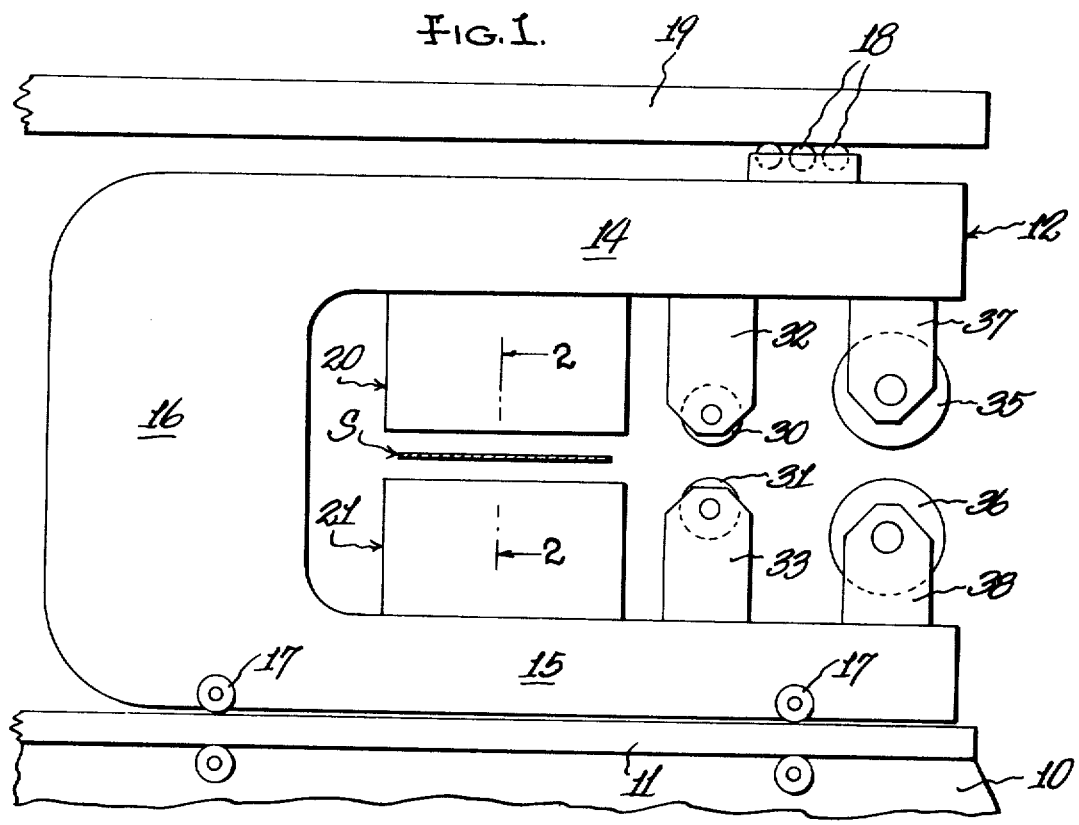
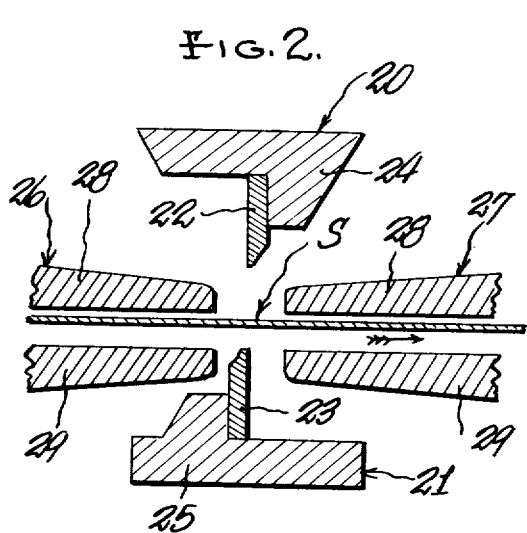
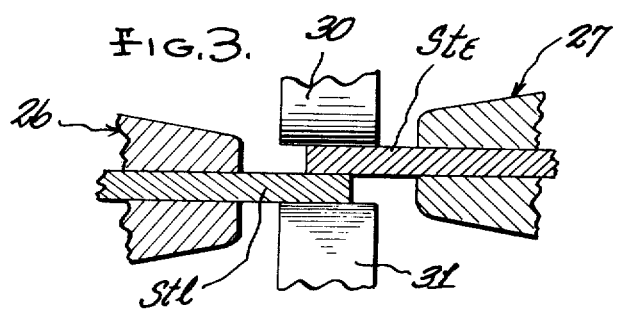
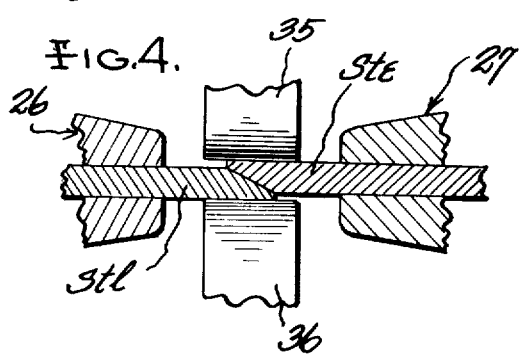
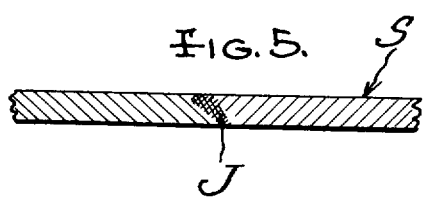

JOINING METAL SHEET OR STRIP

This application is a division of our prior application filed July 22, 1970, Ser. No. 57,159, and which is now abandoned.

BACKGROUND AND SUMMARY

The joining of overlapped ends of metal sheets or strips is well known in the art. Such strip joining is usually accomplished in a continuous strip processing line where speed in joining is a major factor. Previous art known to applicants include welding apparatus wherein the strip ends are trimmed, and then worked on to provide edges which are generally bevelled with respect to the plane of the sheet. This edge working has been accomplished as a separate operation, or has been performed by planishing rolls or peening hammers while the strips are narrowly overlapped.

Heretofore, insofar as we are aware, it has been considered necessary to slightly back off the planished edges to expose narrow widths of the faces thereof before welding the edges together, the theory being that the metal displaced in the welding operation will fill the spaces formed by backing off the planished edges.

We have discovered that it is unnecessary to back off the planished edges to provide a suitable weld substantially coplanar with the opposite faces of the sheets to be joined, and this has resulted in an increase of speed in the welding operation.

Accordingly, it is an object of our invention to provide new and improved methods of and apparatus for joining metal sheets and strip.

DESCRIPTION OF THE DRAWING

In the drawing accompanying this description and forming a part of this specification, there is shown for purposes of illustration, an embodiment which our invention may assume, and in this drawing:

FIG. 1 is a schematic representation of a welding machine illustrating an embodiment of our invention, FIG. 2 is a fragmentary, enlarged sectional view taken in the vicinity of the line 2—2 of FIG. 1, FIGS. 3 and 4 are fragmentary, enlarged views of steps in the joining operation, and FIG. 5 is a fragmentary view showing the joined sheets or strips.

DESCRIPTION OF PREFERRED EMBODIMENT

The joining mechanism schematically shown in FIG. 1 comprises a base 10 having rails or slide surfaces 11 along which a carriage 12 may reciprocate. A welder incorporating structure of the joining mechanism herein disclosed is shown in Taylor et al U.S. Pat. No. 3 446 933, and FIG. 2 of the present drawing is similar to FIG. 12 of the drawings of said patent.

The carriage 12 is preferably of C-shape, as shown in FIG. 1, having upper and lower legs 14,15, respectively, joined by a bight 16. The lower leg 15 may have rolls 17 which hold it to and guide it along the rails 11, and the upper leg may have rolls 18 which guide it along a fixed back-up rail 19 and support it against deflection.

Mounted between the carriage legs 14,15, and adjacent to the bight 16, are upper and lower shear means 20,21 respectively, comprising upper and lower shear blades 22,23 (see FIG. 2) supported respectively by blade carriers 24,25. The metal strip S is shown as continuous in FIGS. 1 and 2 to indicate that it is moving through the throat of the C-shaped carriage for processing in a line downstream of the joining apparatus. Either one or both of the blade carriers 24,25 may be movable toward the strip by any suitable means (such as shown in the Taylor patent).

Clamp means 26,27 are disposed on opposite sides of the shear blades, as shown in FIG. 2, and each means comprises a pair of clamp arms 28,29. The clamp arms are shown in separated relation in FIG. 2 to permit the strip S to move freely therebetween in the direction of the arrow. The clamp means are carried by a stationary part of the joining apparatus, such as the frame (not shown) and may be operated in any suitable manner to accomplish functions as hereinafter described. As an example, the clamp means may be supported and operated as disclosed in the Taylor patent.

Just before the trailing end of the strip S moves through the throat of the carriage, strip movement is halted and clamps 28,29 of the clamp means 27 are tightly engaged against opposite sides of the trailing end of the strip. The shear blades 22,23 are brought together to crop a portion of the strip to insure a straight edge at the trailing end. The clamp means 27 are held clamped to the trailing end and are preferably moved out of the way to provide clearance for the leading end of an incoming strip. The clamps 28,29 of the clamp means 26 are then tightly clamped against opposite sides of the incoming strip and the shear blades are brought together to crop a portion of the incoming strip to insure a straight edge at the leading end which accurately matches the edge of the trailing end. The clamp means 26 are held clamped to the leading end and the clamp means are relatively moved in predetermined manner to provide a narrow overlap between the trailing strip end Ste and the leading strip end St1, as shown in FIG. 3. All of the foregoing may be accomplished in a manner shown in the Taylor patent.

The overlapped strip ends are then subjected to sufficient compressive forces to cause the same to be mashed down to a condition wherein the ends are complementarily bevelled, as shown in FIG. 4. One way to apply the compressive force is to employ peening hammers extending from the carriage arms 14,15 toward the strip S, and cause such hammers to operate on the seam formed by the overlapped strips as the carriage 12 is moved from right to left in FIG. 1. However, it is presently preferred to employ a pair of planishing rolls 30,31 journalled in supports 32,33 extending from respective carriage legs 14,15. One or both supports 32,33 may incorporate means (such as well known fluid cylinders) to urge the rolls 30,31 toward the sheet S as the carriage 12 moves toward the latter.

In the present embodiment, the roll 31 is maintained so that its uppermost part is in the plane of the undersurface of the strip S and the top roll 30 is urged downwardly. Thus, as the carriage 12 is moved to the left, the rolls engage opposite faces of the overlapped strip ends, as seen in FIG. 3, and the roll 30 is forced toward the roll 31 with sufficient pressure to mash down the seam formed by the overlapped ends as the planishing rolls move along such seam from the right edge of the strip (with reference to FIG. 1) to the left.

Welding means is carried by the carriage 12 to weld the mashed-down seam immediately after the planishing rolls. As presently preferred, the welding means takes the form of a pair of seam welding wheels 35,36 journalled in supports 37,38 which are respectively carried by the carriage arms 14,15. As in the case of the planishing rolls, one or both welding wheels may be moved toward the strip S by suitable fluid cylinders, and preferably the lower weld wheel is maintained in line with the lower surface of the strip S while a fluid cylinder urges the upper weld wheel 35 toward the lower wheel so that opposite surfaces of the mashed-down seam are engaged by the weld wheels while sufficient force and welding current is applied to the latter.

In operation, and assuming the strip ends have been trimmed and overlapped, the clamp means 26,27 remain clamped on the strip ends and their position remains unchanged while the planishing rolls 30,31 and the weld wheels 35,36 perform their function as the carriage 12 is moved from right to left. After the seam has been completely welded, the planishing rolls and weld wheels are separated so that the carriage 12 may move from left to right to be positioned for subsequent welding joining operation.

It has been found that by welding the mashed-down joint immediately following the planishing operation, the force of the weld wheels, and the heat generated in the welding operation, will produce a welded joint J (see FIG. 5) which does not materially extend beyond the opposite surfaces of the strip S, despite the fact that the strip ends are firmly clamped against relative movement in a longitudinal direction away from each other at all times during the planishing and welding operations. Although FIGS. 3 and 4 show the clamps in different relative vertical relations, in actual practice there is no such shifting of the clamps since normally the strips to be joined are of a thickness of between 0.004 to 0.186 inches, and therefore FIGS. 3 and 4 are exaggerated only for purpose of disclosure.

We claim:

1. A welding machine for joining adjacent leading and trailing ends of successive elongated strips so that the joined strip may be moved along a line for further processing, said machine comprising a base, a carriage movable along said base in a direction tranversely of the movement of said strip, said carriage being substantially C-shaped to provide a throat through which said strip passes, planishing means including a pair of planishing rolls carried in alignment by respective legs of said C-shaped carriage, one of said rolls being movable toward and away from the other to respectively close and open said rolls, a pair of welding wheels carried in alignment by respective legs of said C-shaped carriage, one of said wheels being movable toward and away from the other to respectively close and open said wheels, said planishing rolls and said welding wheels being carried by said carriage in spaced relation along the line of movement of the latter, said welding machine being adapted for use in a continuous, high-speed strip processing line wherein strip from a coil freely passes through said throat until the coil supply is substantially exhausted, the end portion of such strip forming a trailing end, and wherein the leading end of strip from a second coil is fed into said throat and joined to said trailing end, the improvement comprising:

means for interrupting movement of strip from said first coil through said throat when said trailing end approaches the latter, and first clamp means for clamping on said trailing end, means for feeding the leading end of the strip from said second coil into said throat, and second clamp means for clamping on said leading end, means for relatively shifting said first and second clamp means to narrowly overlap the adjoining edges of said trailing and leading ends and thereafter to hold said trailing and leading ends against longitudinal separation until the weld between them has been completed, said carriage being movable crosswise of said strip from one positiion to a second position, in said one position said planishing rolls and said weld wheels are spaced from one side edge of the overlapped strips with the planishing rolls closer to such edge, means operable after said trailng and leading ends have been overlapped to move said carriage from said one position crosswise of said strip, said planishing rolls and weld wheels closing and said planishing (wheels) rolls progressively moving longitudinally along said overlap to mash down the same to a condition wherein the overlapped edges are complementarily bevelled, said weld wheels following said planishing (wheels) rolls and, simultaneously with planishing, progressively welding the planished overlap under pressure to fuse the bevelled edges to each other in a joint not materially greater than the thickness of a single strip thereadjacent, means to halt crosswise movement of said carriage after said weld wheels have been moved beyond the opposite side edge of the now-welded strips, means to start free movement of the welded strips and the strip from said second coil through said throat and to further apparatus in said processing line, and means to open said plane planishing rolls and said weld wheels and to return said carriage to said first position after the last-mentioned strip movement.

2. A welding machine according to claim 1 wherein shear blades are carried by respective legs of said C-shaped carriage, one of said blades being movable toward and away from the other to shear strip therebetween and then move to open position, in said one position of said carriage said shear blades extending crosswise of the strip and respectively overlying and underlying the same and being in position to crop the trailing and lead ends of the strips.

3. A welding machine for joining a pair of metal sheet or strip sections, said machine comprising a base, a carriage movable along said base in a direction transversely of said sections, said carriage having a throat, a pair of planishing rolls carried in alignment by spaced parts of said throat, one of said rolls being movable toward and away from the other to respectively close and open said rolls, a pair of welding wheels carried in alignment by spaced parts of said throat, one of said wheels being movable toward and away from the other to respectively close and open said wheels, said planishing rolls and said welding wheels being carried by said carriage in spaced relation along the line of movement of the latter, first clamp means for clamping on one strip section adjacent to and along the line of an end thereof, second clamp means for clamping on the other strip section adjacent to and along the line of an end thereof, means for relatively shifting said first and second clamp means to narrowly overlap said strip section ends and thereafter hold said strip sections against longitudinal separation until the welding between them has been completed, said carriage being movable crosswise of said strip sections along the line of the overlap from a position wherein said planishing rolls and said welding wheels are open and are spaced from one side edge of the overlapped strip sections with the planishing rolls closer to such edge, means operable after said strip section ends have been overlapped to close said planishing rolls and said weld wheels, and to move said carriage from said position in a direction crosswise of said strip sections, said planishing rolls progressively moving longitudinally along the overlap to mash down the same to a condition wherein the overlapped ends are complementarily bevelled, said weld wheels following said planishing rolls and, simultaneously with planishing, welding the planished overlap under pressure to fuse the bevelled ends to each other in a joint not materially greater than the thickness of a single strip section thereat, and means to halt movement of said carriage after said weld wheels have moved beyond the opposite side edge of the nowwelded strips.

4. The welding machine according to claim 3 wherein a pair of shear members are carried in alignment by spaced parts of said throat and are cooperable to trim the end of each strip section after said first and second clamp means have been clamped on respective strip sections, but prior to relatively shifting said first and second clamp means to overlap the ends of said sections.

5. The welding machine according to claim 4 wherein said carriage is C-shaped with the legs thereof respectively forming said spaced parts of said throat, and with said shear members positioned closest to the bight of said carriage, and the planishing rolls and welding wheels successively following.

6. The welding machine according to claim 5 wherein one leg of the C-shaped carriage is movably connected to said base, and the opposite leg of said carriage is supported against deflection by movable engagement with a rigid stationary back-up member.

* * * * *

UNITED STATES PATENT OFFICE
CERTIFICATE OF CORRECTION

Patent No. 3,909,578  Dated September 30, 1975

Inventor(s) Arthur L. Williams et al.

It is certified that error appears in the above-identified patent and that said Letters Patent are hereby corrected as shown below:

Assignee: Wein United Inc., should be -- Wean United Inc. --.

Column 4, line 38, delete "plane".

Signed and Sealed this seventeenth Day of February 1976

[SEAL]

Attest:

RUTH C. MASON
Attesting Officer

C. MARSHALL DANN
Commissioner of Patents and Trademarks